Oct. 27, 1964 J. D. BLADES 3,154,769
HELICAL WRAP MEMORY
4 Sheets-Sheet 1
Original Filed July 14, 1958

INVENTOR.
JOHN D. BLADES
BY
J. Walter Schilpp
ATTORNEY

HELICAL WRAP MEMORY

Original Filed July 14, 1958

4 Sheets-Sheet 2

INVENTOR.
JOHN D. BLADES

BY J. Walter Schilpp
ATTORNEY

Oct. 27, 1964 J. D. BLADES 3,154,769

HELICAL WRAP MEMORY

Original Filed July 14, 1958 4 Sheets-Sheet 3

INVENTOR.
JOHN D. BLADES

BY

ATTORNEY

Oct. 27, 1964 J. D. BLADES 3,154,769

HELICAL WRAP MEMORY

Original Filed July 14, 1958

4 Sheets-Sheet 4

INVENTOR.
JOHN D. BLADES
BY
J Walter Schilpp
ATTORNEY

United States Patent Office 3,154,769
Patented Oct. 27, 1964

3,154,769

HELICAL WRAP MEMORY

John D. Blades, Strafford, Pa., assignor to Burroughs Corporation, Detroit, Mich., a corporation of Michigan Continuation of abandoned application Ser. No. 748,405, July 14, 1958. This application Nov. 7, 1962, Ser. No. 236,769
26 Claims. (Cl. 340—174)

The present application is a continuation of application Serial Number 748,405, filed July 14, 1958 and now abandoned.

It is known in the arts of electrical computation, data handling and processing, and digital control to store items of information, each item having one of two possible values, by magnetizing ferromagnetic materials so that each unit of the material remains in one of two possible states of magnetization corresponding to the value of the item of information that the unit of material is to represent. These units of material may be discrete, such as toroidal cores, or may be part of a continuous piece of ferromagnetic material in which divisions into units occur simply as a result of the means employed to magnetize the material or to detect magnetization of the material. Conventional magnetic tapes and drums exemplify the second class. Perforated plates of magnetic material threaded with conductors constitute a kind of intermediate between the two classes in that the number of units is determined by the number of holes but the boundaries between the units are not discretely determined by physical boundaries of the material. It is a convenience to employ magnetic materials whose physical shape need not be discretely formed to demark the boundaries within which specific units of information may be stored.

Certain ferromagnetic materials may be so processed that they possess an axis of preferred magnetization, so that in the absence of external magnetizing fields they remain magnetized in one of the two possible senses along that axis, which may be simply denoted the magnetic axis. This behavior results in a hysteresis loop which is substantially rectangular, since the material will tend to remain in its original state until an applied external field is sufficient to drive it from the original state, whereupon it will tend to change to the other stable state.

It is well known that application of stress to certain ferromagnetic materials will produce such anisotropy and a preferred direction of magnetization even if none existed without the stress. To apply this in a macroscopic scale, as by mounting a sizable sample of material between clamps and applying stress, has the disadvantage that it is difficult to apply stress uniformly by such means, and to preserve it at its desired value. However, it is possible to produce a sufficiently uniform distribution of stress by such means as rolling an alloy in a strip and not relieving stress by subsequent annealing. In particular, an alloy of approximately 4 percent molybdenum, 79 percent nickel, and the remainder substantially iron, which is well known in the art of magnetics, if rolled into a thin strip and not annealed after rolling shows a preferred direction of magnetization along the direction of rolling. Reference: R. A. Tracy, p. 104, Proceedings Eastern Joint Computer Conference, 1956. Certain other materials are known which, while possessing the requisite magnetic properties, are either physically inflexible or suffer impairment of their magnetic characteristics if stressed or deformed after processing. Ferrites are examples of the first category, and certain alloys are examples of the second category.

My present invention pertains to the use of materials in the categories above described for the storage of information in such a manner that the number of bits or elements of information which may be stored is well in excess of the number of pieces or assemblies of ferromagnetic material employed for such storage, without requiring that physical boundaries be formed in the pieces of ferromagnetic material to delimit the regions in which each element of information is stored. More particularly, it pertains to the storage of various bits of information at various points along the length of one dimension of such a piece of ferromagnetic material. It is usually desirable to minimize the total volume of magnetic material employed, since the energy required to alter the magnetization of a given material is proportional to the volume. If, as is here proposed, different parts of a length of magnetic material are to be magnetized and reversed independently of other adjacent parts, it is also desirable that such parts be long in the direction of the flux relative to their dimensions at right angles to such direction, in order that the demagnetizing effect of the poles at the boundaries between two differently magnetized parts may be minimized. These considerations suggest that the cross section of the magnetic material be minimized; but this requires that, for a given maximum flux density, the total flux be minimized. Since the voltage induced by flux reversal at a given speed is proportional to the product of the total flux by the number of turns linked with the flux, such product being conventionally known as the "linkages," it appears that it is desirable to maximize the number of times the given flux is linked with the conductor in which voltage is to be induced. In my present invention I achieve a beneficial increase in the number of linkages by wrapping or interwrapping or interweaving conductors with pieces of ferromagnetic material in various ways suited to the particular characteristics of various magnetic materials, and in manners well suited to ease of assembly, and to the mechanization of many of the steps of such assembly. As a result of the simplicity of assembly, it is possible to achieve great compactness for a given storage capacity by the practice of my invention.

One form of my invention consists in wrapping, around one or more conductors as an axis, a strip or tape of ferromagnetic material having a direction of preferred magnetization so that current passing through these central conductors will produce a magnetizing field lying approximately parallel to the surface of the tape, but at an angle with the preferred direction of magnetization of the tape, and providing other conductors capable of producing, by passage of electrical current through them, a magnetizing field parallel to the surface of the tape but at a different angle with the preferred direction of magnetization of the tape. The latter conductors may be turns wrapped around some part of the assembly of tape and central conductors, and thus be capable of producing a field component parallel to the central conductors, and orthogonal to the field produced by the central conductors. It is evident that it is possible to choose the magnitudes and senses of currents through the central conductors and through the surrounding conductors such that the field of the central conductors alone or the field of the surrounding conductors alone will not suffice to alter the magnetization of the tape; but where the two fields exist together, as at the place where the surrounding conductors circle the wrapped central conductors, the combined fields will suffice to alter the magnetization of the tape in that vicinity only. Thus, the number of separately identified and used bistable entities may greatly exceed the number of physically separate ferromagnetic pieces. In particular, an array may be formed of a number of separate wrapped central conductors physically parallel to each other; and surrounding conductors may be provided by weaving them as a woof upon the wrapped axial conductors as a warp. Adjacent woof wires woven in opposite sense, may be connected in series and will constitute the equivalent of a number of single turns in series, one around each warp wire. Thus, application of current to a selected central conductor and a selected woof loop will permit control of the magnetization of the tape at the nearest juxtaposition or crossing of the two selected conductors.

If current is passed through a helically wrapped tape with successive turns insulated from each other, the current will tend to demagnetize the tape by producing a magnetizing field at right angles to the axis of easy magnetization and will permit a relatively weak field subsequently to magnetize the tape along the said axis.

Thus, the recording of data may be effected by restoring all the tape around a central conductor to a reference state (the "zero" state, in conventional computer vernacular) and then recording a signal (a "one") by passing current through the central conductor and current through a selected surrounding conductor so that the magnetization of only that part of the tape adjacent to both conductors is reversed. To determine at some future time whether a signal (a "one") has been stored there, a current of opposite sense may be passed through the surrounding conductor, sufficiently greater in magnitude than the current used to record the signal so that the greater current in the non-axial conductor alone will restore the adjacent portion of the tape to the reference ("zero") state. The change of magnetizaiton will induce a voltage in the central conductor which voltage may be detected to determine that a signal has been stored in that particular element of the tape. The induced voltage will be relatively large because of flux linkages between the tape and the central conductor will be multiplied by the wrapping of the tape around the central conductor.

The second form of my invention is intended particularly for convenient application of the principles of my invention to the use of ferromagnetic materials which are too inflexible to bend readily or at a small radius, or which suffer deterioration of their desired properties from such treatment. It is clearly not desirable to wrap such ferromagnetic materials around a central conductor, particularly one of small dimensions, in order to increase the number of linkages by the embodiment of the first form of my invention. Instead, in this second form I achieve a large number of linkages between conductor and ferromagnetic material by wrapping the conductor helically around a suitable central core. Such a wrapped core forms a convenient primary assembly which may readily be further assembled into data storage devices of characteristics varying according to need. Another form of my present invention is produced by twisting magnetic material and core around each other. This requires that the magnetic material be somewhat flexible, but does not require such great deformation as is necessary if the magnetic material is to be wrapped around a straight central conductor. The second and third forms of the present invention thus impose simple mechanical and geometric requirements on the magnetic material, and impose requirements for flexibility, shape convenient for wrapping, and the like properties, upon conductive materials which, in the conventional art, are usually metals noted for ductility, flexibility, and malleability.

Accordingly, one object of my invention is to provide a mechanically static ferromagnetic binary data storage means capable of recording data by selective coincidence of currents in separate circuits, in such fashion that the number of elements of information stored may exceed the number of individual pieces of ferromagnetic material provided.

Another object of my invention is to provide a ferromagnetic binary data storage means capable of simple and rapid assembly at least partly by machines or principles well known and proven, as weaving machines.

Another object is to provide a ferromagnetic binary data storage in which the ferromagnetic material may be of standard commercial form and may be applied by simple mechanical operations not calculated to produce any particular stresses in the material.

Another object is to provide a ferromagnetic binary data storage in which a single conductor in the simplest embodiment may be readily replaced by several conductors whose separate effects may be caused to assist or oppose each other, thereby permitting greater latitude in the design of the selection system.

A further object of my invention is to permit the convenient use of magnetic material of various degrees of flexibility or stiffness and various cross-sectional shapes as a storage medium employing a small volume per unit of information with a relatively high read-out voltage.

Another object of my invention is to extend well-tried principles of voltage induction to the improvement of large-capacity inexpensive static data storage devices.

Further objects and advantages of my invention will appear in the course of the following description.

Figure 1:
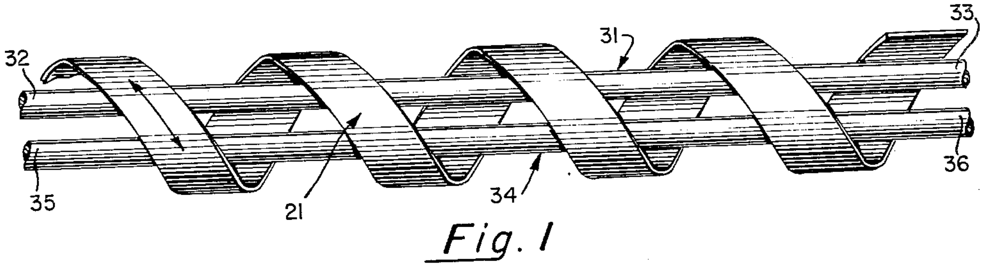
FIG. 1 represents a physical arrangement of central conductors helically wrapped with ferromagnetic material, according to my invention.

In FIG. 1, 31 and 34 represent electrical conductors with respective terminals 32 and 33 for 31, and terminals 35 and 36 for 34. As a practical matter they must be insulated from each other, and from the tape 21 (to be further described) if it is conductive. Such insulation can be achieved by insulating 31 and 34 and 21, or any two of these three; for many applications it is permissible to have contact between 31 and 34 and 21 at points always identical in potential so that no undesired circulation of current between or among the various conductors will occur. The art of electrically insulating circuits to prevent undesired or deleterious circulating currents or short circuits is over a century old and well understood. In all of the following, it is to be understood that conductors or conducting parts are provided with such insulation as the art shows to be required to prevent the flow of current by undesired paths. Consistently therewith, no insulation will be shown in the drawings since the disclosure of my invention would be rendered less easy to understand if the presentation of its basic principles were beclouded by the inclusion of matter so well known in the art.

The tape 21 of FIG. 1 is ferromagnetic, having a substantially rectangular hysteresis loop and having a magnetic axis, or direction of preferred magnetization (as indicated by double-headed arrows) substantially parallel to its length. It is so wound around the central conductors 31 and 34 that its magnetic axis is approximately a helix about the central conductors. It is known that cold rolled and unannealed strip of so-called molypermalloy, consisting of approximately 4 percent molybdenum, 79 percent nickel, remainder substantially iron, in thickness of a fraction of a thousandth of an inch, has the characteristics described for tape 21 and may be wrapped as described without impairing these characteristics. My invention does not depend upon the use of a particular material, and the disclosures herein are applicable to any material having the magnetic properties described in the preceding. Thus, for example, and adhesive non-metallic tape coated with particles of nonconducting ferromagnetic material so aligned as to possess the magnetic axis as above described may replace the metallic tape where the ferromagnetic material is not also used as a conductor. For replacement in applications where the metallic ferromagnetic material is used as a conductor, a non-ferromagnetic conductor may be attached to the non-conductive ferromagnetic wrapping and used as an equivalent conductor. The tape 21 may be wound with a lap (in which case, if tape 21 is conducting, successive turns should be insulated from each other to minimize eddy currents) or, if it is desired to increase the total magnetic flux produced by magnetization of the tape 21, several pieces may be wound in parallel or superposed. The central conductors represented are two; depending upon the particular circuitry desired, a single central conductor or a multiplicity thereof may be used.

Figure 2:
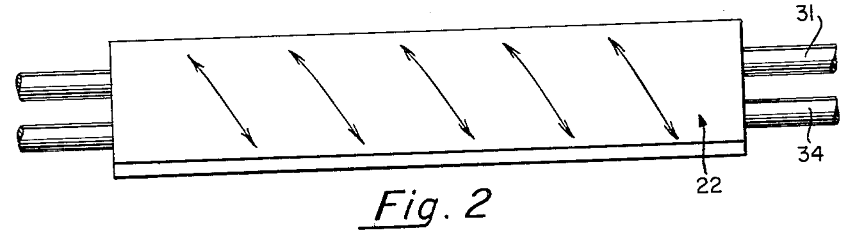
FIG. 2 represents an alternate physical arrangement of central conductors and ferromagnetic material.

FIGURE 2 shows the same central conductors 31 and 34 indicated in FIG. 1. The wrapping 22, however, replaces the helically wrapped tape 21. Wrapping 22 is of the same properties as tape 21 with the exception that its magnetic axis is oblique to both of the principal dimensions of the rectangle which is its shape. As illustrated in FIG. 2, 22 may be wrapped in a simple approximately right cylindrical sleeve, yet its magnetic axis will be substantially helical around the central conductors. Possibilities of substitution apply to wrapping 22 as cited for tape 21, with such obvious modifications as the known art would dictate.

The separations shown in the figures between the central conductors and the ferromagnetic wrappings are exaggerated for clarity of disclosure; the ferromagnetic wrappings will ordinarily be as close as feasible to the central conductors.

Figure 3:
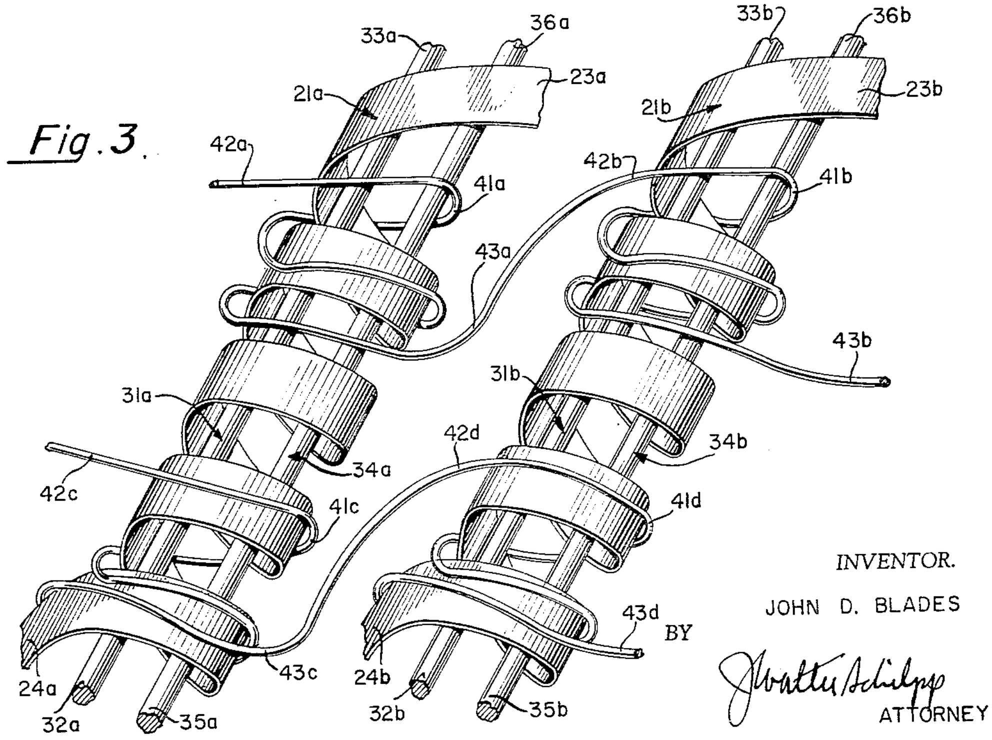
FIG. 3 represents elements of FIG. 1 or FIG. 2 wound with surrounding windings according to my invention.

FIGURE 3 represents two elements as of FIG. 1, wrapped with solenoidal windings 41*a*, 41*b*, 41*c* and 41*d* over the ferromagnetic wrappings 21*a* and 21*b*, duplicates of 21 of FIG. 1. Specifically, central conductor 31*a*, having terminals 32*a* and 33*a*, and central conductor 34*a*, having terminals 35*a* and 36*a*, are wrapped by tape 21*a*, having terminals 23*a* and 24*a*. The second element is similarly described by substituting final letter "*b*" in place of "*a*" in all designations of the preceding sentence. Around the upper half (in FIG. 3) of 31*a*, 34*a*, and 21*a* there is wound solenoid 41*a*, having initial terminal 42*a* and final terminal 43*a*; and around the lower half of 31*a*, 34*a* and 21*a* there is wound a solenoid 41*c* having initial terminal 42*c* and final terminal 43*c*. Similarly, on the assembly of 31*b*, 34*b* and 21*b* there is wound solenoid 41*b* as the homologue of 41*a* and solenoid 41*d* as the homologue of 41*c*, with terminal designations completely homologous and differing only in final lettters as represented. Terminal 43*a* is connected to terminal 42*b*, and terminals 43*c* is connected to terminal 42*d*, as represented in FIG. 3. Thus, solenoid 41*a* is in series with solenoid 41*b*; and solenoid 41*c* is in series with solenoid 41*d*.

It is apparent from the known laws of electromagnetics, upon consideration of FIG. 3, that a current flowing through a central conductor 31*a*, will produce a magnetizing field approximately parallel to the conductors of solenoid 41*a*, and therefore having a component in the direction of the magnetic axis of tape 21*a*. A current flowing through solenoid 41*a* will produce a magnetizing field inside the solenoid substantially parallel to the central conductor 31*a*, and therefore having a component in the direction of the magnetic axis of 21*a*, the term magnetic axis here and elsewhere in this specification signifying the direction of easy or preferred magnetization of the ferromagnetic material. The total magnetizing field produced by current in central conductor 31*a* and by current in solenoid 41*a* may, by suitable choice of current values, be substantially parallel to the magnetic axis of tape 21*a* and in excess of the coercive force everywhere in those portions of 21*a* in the immediate vicinity of conductor 31*a* and solenoid 41*a* so that those portions of tape 21*a* will be magnetized in the direction of the resultant field, even if they were originally magnetized in the opposite direction.

In the situation thus far considered, that part of tape 21*a* lying substantially inside solenoid 41*a* will be subjected to a magnetizing field from the current in conductor 31*a*; and that part of tape 21*b* lying within solenoid 41*b* will be subjected to a magnetizing field from the current flowing through 41*a* if (as FIG. 3 suggests by the interconnections represented) that current also flows through 41*b*. However, it is well known that it is possible so to choose the magnitudes of current in central conductor 31*a* and solenoid 41*a* that only where the fields produced by these two currents are present together in substantial amplitude (as distinct from the faint fields which would exist at a distance) will the magnetizing field be greater than the coercive force of the material of 21*a* and thus sufficient to reverse the magnetization of the material of 21*a*. Thus, the portion of tape 21*a* inside solenoid 41*c*, and tape 21*b* will not be affected by the magnetizing fields here proposed.

It is thus evident that by selective passage of current through a central conductor and a pair of solenoids in series, corresponding to what is known in the art as row and column selection, it is possible to control independently the state of magnetization of two distinct parts of ferromagnetic material 21*a* and two distinct parts of its homologue 21*b*. In brief, a binary storage device with a capacity of four "bits" or binary digits has been described. It is apparent from the known art that the selecting field may be produced by current through several central conductors, and that multiple solenoidal windings may be superimposed so that their fields add in a given space. Special attention is, however, invited to the fact that the tape wrapping itself (21*a*, 21*b*) forms a solenoidal winding obviously coincident with itself, and having terminals 23*a* and 24*a*, and 23*b* and 24*b*.

Figure 4:
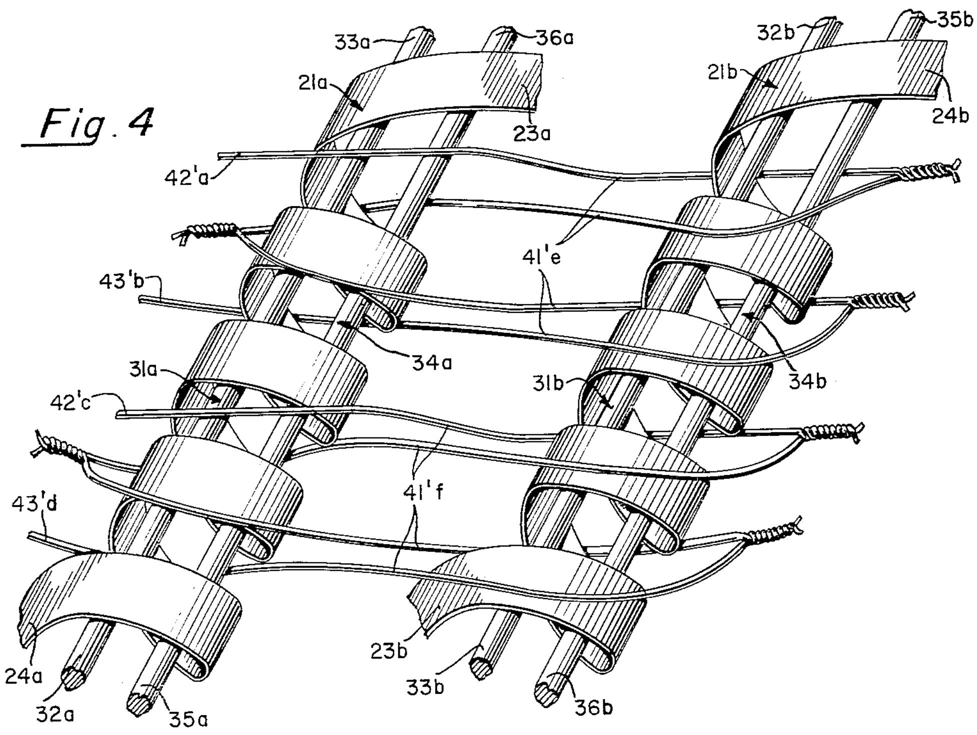
FIG. 4 represents elements of FIG. 1 or FIG. 2 woven with surrounding windings according to my invention.

The operation of winding successive solenoids over several wrapped central conductors, while capable of performance by mechanical devices, is of several distinct steps: winding on one conductor, indexing to the next conductor, winding on that, and so forth. Weaving is a somewhat simpler operation in that the movement of the woof is continuous, except for reversal at the end of the path, and the shifting of the warp is a simple alternation. Furthermore, weaving techniques are the beneficiaries of some millennia of experience and, recently, of two centuries of intensive development. Except for some slight additional effective distributed capacities, there is little difference if a winding of N turns is formed by winding all turns in succession or by providing a half turn, carrying the conductor off to some other points, and returning to the point of interest to apply another half turn, and so forth. This is actually what is accomplished by weaving the conductors of the solenoids as a woof on the wrapped central conductors as a warp. The only major difference between weaving and winding solenoids is that, while successive solenoids may be wound with the same sense, the nature of weaving produces alternate reversals of polarity. Thus, FIG. 4 represents two units as depicted in FIG. 1 with the equivalent of solenoids 41 provided by weaving of weft conductors (which are represented as joined by twisted splices), the upper system of weft conductors being marked 41'*e* and the lower 41'*f*. Comparison of FIGS. 3 and 4 will reveal that in FIG. 3 points on the left-hand and right-hand assemblies are strictly homologous, correspondingly numbered points serving similar functions at homologous locations, with the difference in identity indicated only by the postliterals, "*a*," "*b*," "*c*" or "*d*." In FIG. 4, the reversal of sense of the woof windings on alternate warps causes a top-to-bottom reversal of electrically homologous points; thus 32*a* is at the bottom, 32*b* is at the top, of FIG. 4. The electrically homologous points in FIGS. 3 and 4 have been given identical or obviously cognate numbers, so that the demonstration of the use of the invention in FIG. 6, and the accompanying description, will apply correct references to either FIGS. 3 or 4.

Figure 5:
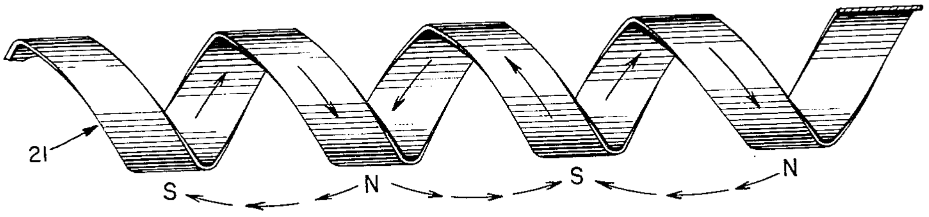
FIG. 5 illustrates a distribution of magnetization of ferromagnetic material.

FIG. 5 represents a tape helix of three turns, each turn being separately magnetized as indicated by the arrows, with the letters S and N representing the approximate locations of north and south poles in the tape. The arrows external to the tape 21 indicate the general path which the turn flux must follow through the space surrounding the tape to complete the magnetic flux path. This indicates the general situation which might exist if the two extreme loops contained in the reference or "zero" value of information and the center loop contained the alternate or "one" value of information. It appears clearly that the return path through space is made shorter by the winding of the tape 21 in a helix.

Figure 6:
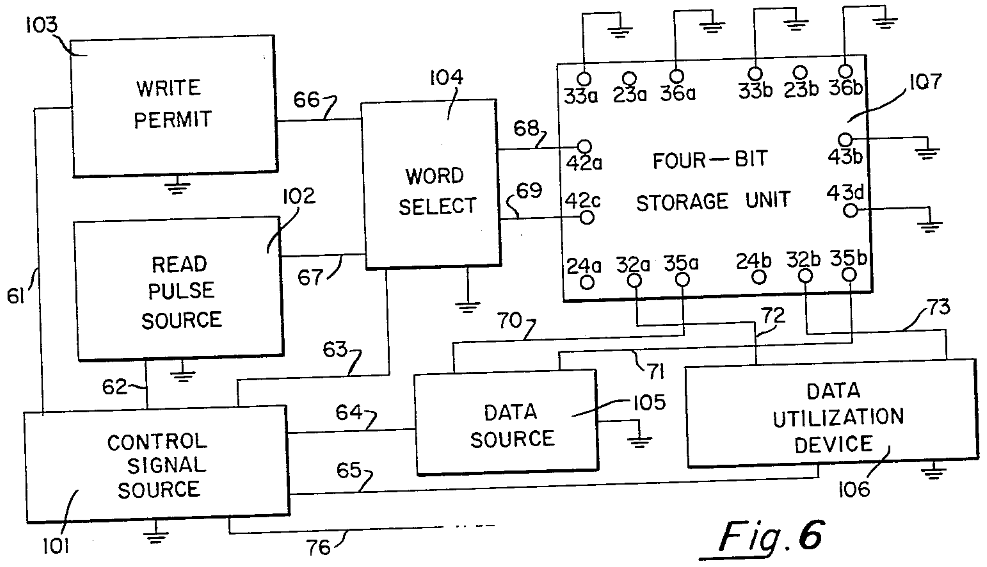
FIG. 6 represents schematically the use of the assemblies of FIG. 3 or FIG. 4.

In FIG. 6, the rectangle 107 represents the assembly shown in detail in FIG. 3, or the equivalent one shown in detail in FIG. 4, it being understood that 42*a*, 42*c*, 43*b*, 43*d* of FIG. 6 read upon 42'*a*, 42'*c*, 43'*b*, 43'*d*, respectively of FIG. 4. Control signal source 101 is a device for producing in the requisite sequence the actuating signals required by the items marked 102 to 106, inclusive. In a computer 107, control signal source 101 would ordinarily be a part of the central control system of the computer proper. At the beginning of a complete cycle of use, control signal source 101 transmits a signal over path 62 to read pulse source 102, causing it to transmit through path 67 a read pulse to work select 104, which transmits the read pulse through path 68 or path 69 to terminal 42*a* or 42*c*, respectively. The choice of path and terminal will be determined by the control signal sent simultaneously or previously over path 63 from control signal source 101 to word select 104. Let it be assumed that path 68 and terminal 42*a* receive the read pulse. The pulse will flow from terminal 42*a* through the windings about the upper parts of tapes 21*a* and 21*b* to terminal 43*b* to ground, as conventionally represented. This current pulse is produced of such magnitude that it is capable, without the assistance of other currents, of magnetizing the portion of tapes 21*a* and 21*b* near terminals 23*a* and 23*b*, respectively, in the direction of these terminals. This it does by producing a strong axial magnetic field in the direction of 23*a* and 23*b*, respectively. The component of such field along the magnetic axes of 21*a* and 21*b*, respectively, produces the magnetization described. If the magnetization operation involves the reversal of magnetization in any part of 21*a*, a voltage will be induced in conductors 31*a* and 34*a*; similarly for reversal of magnetization in 21*b*, there will be induction of voltage in conductors 31*b* and 34*b*. However, the control signal source 101 is so constituted that for the clearing operation it does not provide on either path 64 or path 65 a signal to data source 105 or data utilization device 106, respectively, to close their respective circuits with the respective conductors named. Therefore the induction of voltage in the central conductors during the clearing operation produces no effects.

After the completion of the clearing operation thus described, the two units of storage thus cleared are considered to contain logical zeros, or to be in the reference condition. The other two units of tape nearest to terminals 24*a* and 24*b* may be cleared similarly, by a similar operation.

The next typical operation is writing of data. Control signal source 101 sends a signal over path 61 to write permit 103, which by path 66 transmits through word select 104 and paths 68 or 69, a current pulse opposite in sign to that produced by read pulse source 102 and of smaller amplitude. Let it be assumed that the control signal source 101 sends to word select 104 a signal which causes it to send the pulse from write permit 103 over path 68 to terminal 42*a*. The amplitude of the write permit current pulse is such that it produces in the portions of tapes 21*a* and 21*b* nearest to upper ends 23*a* and 23*b*, respectively, a field toward lower ends 24*a* and 24*b*, respectively, but not sufficient alone to reverse the magnetization of those portions of the tape. However, while the write permit current pulse exists, control signal source 101 transmits over path 64 to data source 105 a signal which causes data source 105 to transmit binary information signals over paths 70 and 71 to terminals 35*a* and 35*b*, respectively. For the polarities of windings and conductors shown, these information signals should be negative for the signal having a "one" value, and zero for a signal having a "zero" or reference value. Let it be assumed that the signal of path 70 has a "one" value, and that of path 71 has a "zero" value. The negative current pulse representing the "one" signal will flow from terminal 35*a* through conductor 34*a*, producing a field circular or solenoidal about the conductor, toward the left of FIG. 3 above the central conductor 34*a*, and therefore producing a magnetizing field having a component tending to magnetize tape 21*a* downward. However, the magnitude of the signal is not sufficient to produce this effect by itself. Therefore the tape 21*a* will be magnetized downward in its upper part where negative write permit current entering at terminal 42*a* also produced a field; but the tape 21*a* in the lower half where there is no auxiliary field will remain magnetized upward in the reference condition. Similarly, no part of tape 21*b* will be subjected to two fields simultaneously, and therefore the part of the tape 21*b* nearer to terminal 23*b* will remain in the reference or "zero" state appropriate to the "zero" value of signal assumed for path 71. It will be readily apparent how "one" or "zero" values of signals may be recorded in any of the four tape regions.

The final operation requiring illustration in the use of this invention is reading of the data stored by the writing operation. Let it be assumed that the data whose writing is described in the preceding paragraph is that to be read. Control signal source 101 sends by path 63 to word select 104 a signal causing word select 104 to open path 68 to terminal 42*a*. Control signal source 101 sends by path 62 to read pulse source 102 a signal which causes read pulse source 102 to transmit by path 67 a read-out pulse through word select 104 and path 68 to terminal 42*a*. The read-out pulse passes to ground through the windings of 107, detailed in FIGS. 3 and 4, and causes the portions of tapes 21*a* and 21*b* nearest to terminals 23*a* and 23*b*, respectively, to be driven to the reference or "zero" state. The tape portion of 21*a* which was driven by the previous writing operation to the "one" condition, will suffer a large flux alteration, which will induce a large voltage in conductor 31*a*, which voltage will appear at terminal 32*a* and path 72. Since the homologous portion of tape 21*b* was left in the reference or "zero" condition at the end of the writing operation, no great flux change will occur in tape 21*b* and no appreciable voltages will be induced in conductor 31*b*.

As part of the reading operation, control signal source 101 transmits by path 65 to data utilization device 106 a signal causing it to open the signal path 72 and 73 so that any signals appearing at terminals 32*a* and 32*b* may enter the circuits of data utilization device 106. In the present instance, a voltage will appear in path 72 but none in path 73. The data utilization device will make use of this stored information in accordance with the purposes for which it is constructed.

Figure 7:
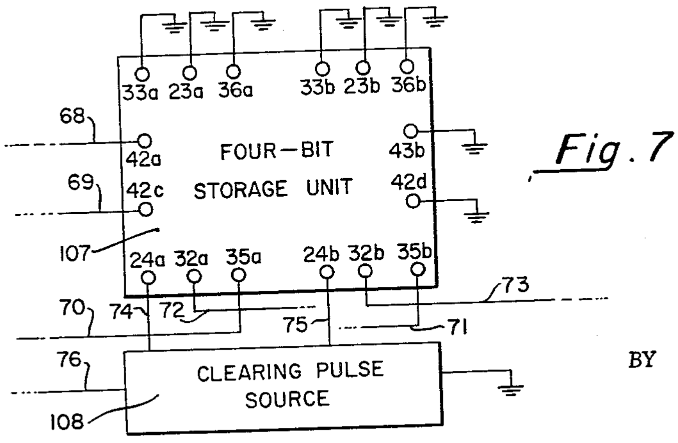
FIG. 7 represents an addition to the functions of FIG. 6.

The foregoing describes in detail the mode of performing the standard functions of a binary data store. The known art will indicate possibilities of vast increase in the store size and the number of binary values capable of being stored, and numerous other variations which are comprehended in my invention. It also appears that current through tape 21 will produce a magnetizing field tangential around the tape at right angles to its axis of easy magnetization. Thus a separate circuit may be provided to demagnetize the tape and render it capable of being restored to the zero or reference state of magnetization by the application of a relatively weak axial magnetizing field. A convenient auxiliary clearing circuit may be provided to permit the tape to be restored to its reference or "zero" condition by a magnetizing field which, in the absence of the auxiliary circuit, would not be sufficient to produce such restoration. A specific means of doing so is illustrated in FIG. 7. The auxiliary apparatus is as in FIG. 6 and is not here repeated. Four-bit storage unit 107 is represented with the alteration from FIG. 6 that terminals 23*a* and 23*b* are connected to ground, conventionally represented and there is also represented a clearing pulse source 108. Terminals 24*a* and 24*b* of 107 are represented as connected to 108 by conductors 74 and 75, respectively, and control line 76 is represented as connecting clearing pulse source 108 to control signal source 101 of FIG. 6. Other connecting lines, 68, 69, 70, 71, 72 and 73 are connected as in FIG. 6. The only difference between FIG. 6 and FIG. 7 is in the addition of 108, and the connections made to terminals 24*a*, 24*b* and 23*a* and 23*b*, as represented.

The manner of operation of the arrangement represented in FIG. 7 permits clearing of data stored in tape 21*a* or in 21*b*, as follows. A control signal generated by control signal source 101 is transmitted by line 76 to clearing pulse source 108. In response to such control signal, clearing pulse source 108 applies through (e.g.) line 74 to terminal 24*a* a current pulse which passes through the helical winding of tape 21*a* to terminal 23*a* and thence to ground. This current pulse is specified as sufficient in magnitude to produce a magnetizing field sufficient to demagnetize all of tape 21*a*. Alternatively, clearing pulse source 108 may be caused to apply a similar current pulse to tape 21*b* via line 75 and terminal 24*b*. If now by the devices and logic of FIG. 6 already described there are applied to terminals 42*a* and 42*c* of 107 pulses of the same polarity as the read pulses described in connection with the description of FIG. 6, but of suitably lower amplitude so that they are insufficient by themselves to reverse the magnetization of tape 21*a* or 21*b* when no demagnetizing field has been applied to those tapes, when these lower amplitude pulses will be able to cause the demagnetized tapes to return to the reference or "zero" condition. Thus by selective application of current to terminals 24*a* or 24*b*, it is possible to selectively clear a particular digit store in both of the words of 107. This is sometimes desirable. Obviously, the employment of the ferromagnetic tape as a conductive path is susceptible of many variations, according to the known art.

Figure 8:
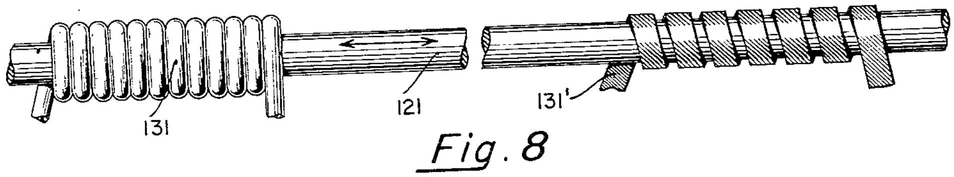
FIG. 8 illustrates a mode of applying conductors to the magnetic material in the practice of my invention.

In FIG. 8, 121 represents a ferromagnetic core having a direction of easy or preferred magnetization substantially parallel to its axis, as indicated by the double-pointed arrow in the figure, and possessing a substantially rectangular hysteresis loop for magnetizing fields or components thereof applied along its axis. The ordinary processes of drawing a wire through a die tend to produce crystal orientation and internal stresses disposing many ferromagnetic materials to such magnetic characteristics. For example, nickel wire not annealed after drawing demonstrates such properties. Conductors 131 and 131' differ only in shape of cross-section, 131 being of conventional circular cross-section, 131' being of flattened cross-section which may be more convenient in certain circumstances. The significant point illustrated by the figure is that the conductors 131 and 131' are wound helically about the central core 121 so that magnetic flux along or parallel to the axis of 121 will be linked many times with the conductors 131 and 131'.

Figure 9:
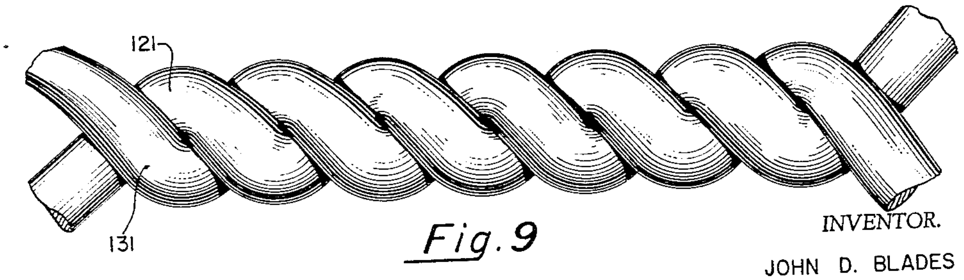
FIG. 9 illustrates a modification of the mode of applying conductors to magnetic material in the practice of my invention.

FIGURE 9 represents another manner of securing such linkage, in which conductor and ferromagnetic material are twisted about each other so that it is not possible to identify either as axis. It is, of course, apparent that core 121 need not be of circular cross-section, nor need it be of one piece, but may be composed of several pieces having their lengths substantially parallel, regardless of whether they are simply parallel to each other, or braided or twisted or otherwise intertwined with each other. Likewise, the fundamental disclosure by conductor 131 is of a conducting path, which in many instances may most conveniently be provided by a conventional insulated wire, but may be equally well furnished by equivalents such as a conducting spiral formed by painting a spiral of metallic paint or metal compound around a suitable insulating coating overlaying core 121, and processing the painted spiral by any means required to render it a mechanically stable conductor.

Figure 10:
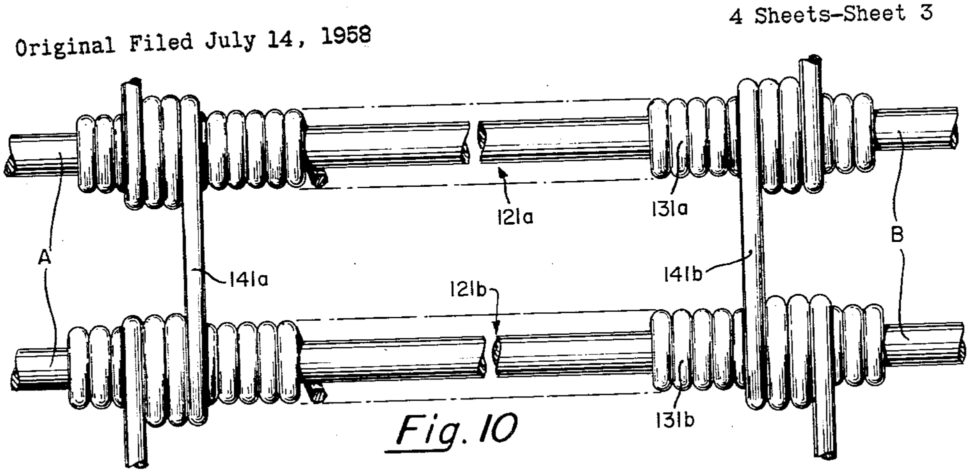
FIG. 10 illustrates an alternative mode of assembling magnetic material with attached conductors into a data storage assembly, in accordance with my invention.

In FIG. 10, there are represented two lengths of conductor-entwined core 121*a*, 131*a* and 121*b*, 131*b*. A single length 141*a* of conductor is indicated as wrapped as a solenoid around 121*a*, 131*a* and in a separate solenoid around 121*b*, 131*b*. Similarly, a second conductor 141*b* is wrapped in separate solenoids around 121*a*, 131*a*, and around 121*b*, 131*b*. Current through conductor 131*a* will produce a magnetizing field substantially parallel to the length and thus to the direction of easy magnetization of core 121*a*; and current through conductor 141*a* will produce magnetizing fields parallel to the lengths of cores 121*a* and 121*b*, respectively, but chiefly near the ends marked A, and having, indeed, their maximum values inside the solenoids formed by the conductor 141*a*. Similarly, current through conductor 141*b* will produce magnetizing fields parallel to the lengths of cores 121*a* and 121*b*, but having their maximum values inside the solenoids formed by conductor 141*b*. It now appears from the known art, and is abundantly taught by numerous patents and other publications in the computer field, that it is possible to apply a first current through conductor 131*a* and a second current through conductor 141*a* of such magnitudes that the magnetizing field component produced by either the first or the second current alone will not equal the coercive force of the cores 121*a* or 121*b*; but that where the fields produced by the two currents are both strongly present, as they are near the end A of core 121*a*, their resultant exceeds the coercive force. If the coercive force is thus exceeded, and if it is opposite to the initial direction of magnetization of the core 121*a*, the magnetization of core 121*a* will be reversed in direction near the end A of core 121*a*, without altering the magnetization of the other core 121*b* or that of the other end B of core 121*a*. Similar procedures permit the independent control of the direction of magnetization of the other three parts of the cores 121*a* and 121*b*; obviously a larger number of conductors analogous to 141*a* with a correspondingly greater number of individual solenoids in the system would permit the selection and independent control of a larger number of separate elements of cores 121. The number of subdivisions of a core 121 capable of separate and independent reversal of magnetization will depend upon the possible number of individual divisions within which the magnetizing field can be individually controlled, and will therefore depend upon the exact design of the magnetizing coils, but the demagnetizing effect of the discrete poles formed at each boundary between two senses or directions of magnetization will determine how small an independent element may be and still be stable when magnetized in a sense opposed to that of its neighbors.

It is apparent that, if a given sense of magnetization is assigned a reference or "zero" significance, in accord with conventions of the present known art, an alternate or "one" significance may be assigned to the reverse direction of magnetization. Thus, it is possible to apply to a given conductor e.g. 141*a*, a current of suitable polarity and magnitude to drive the core elements which contain a "one" and therefore were initially of reversed magnetization will be reversed to the reference condition with a corresponding change of flux and the induction of a voltage in conductors 131. Alternatively, a current pulse as described, known in the trade as a "read" pulse may be applied to a given wrapping conductor 131*a* and any elements reversing from the "one" to the "zero" state will induce voltages in the solenoids of conductors 141.

Figure 11:
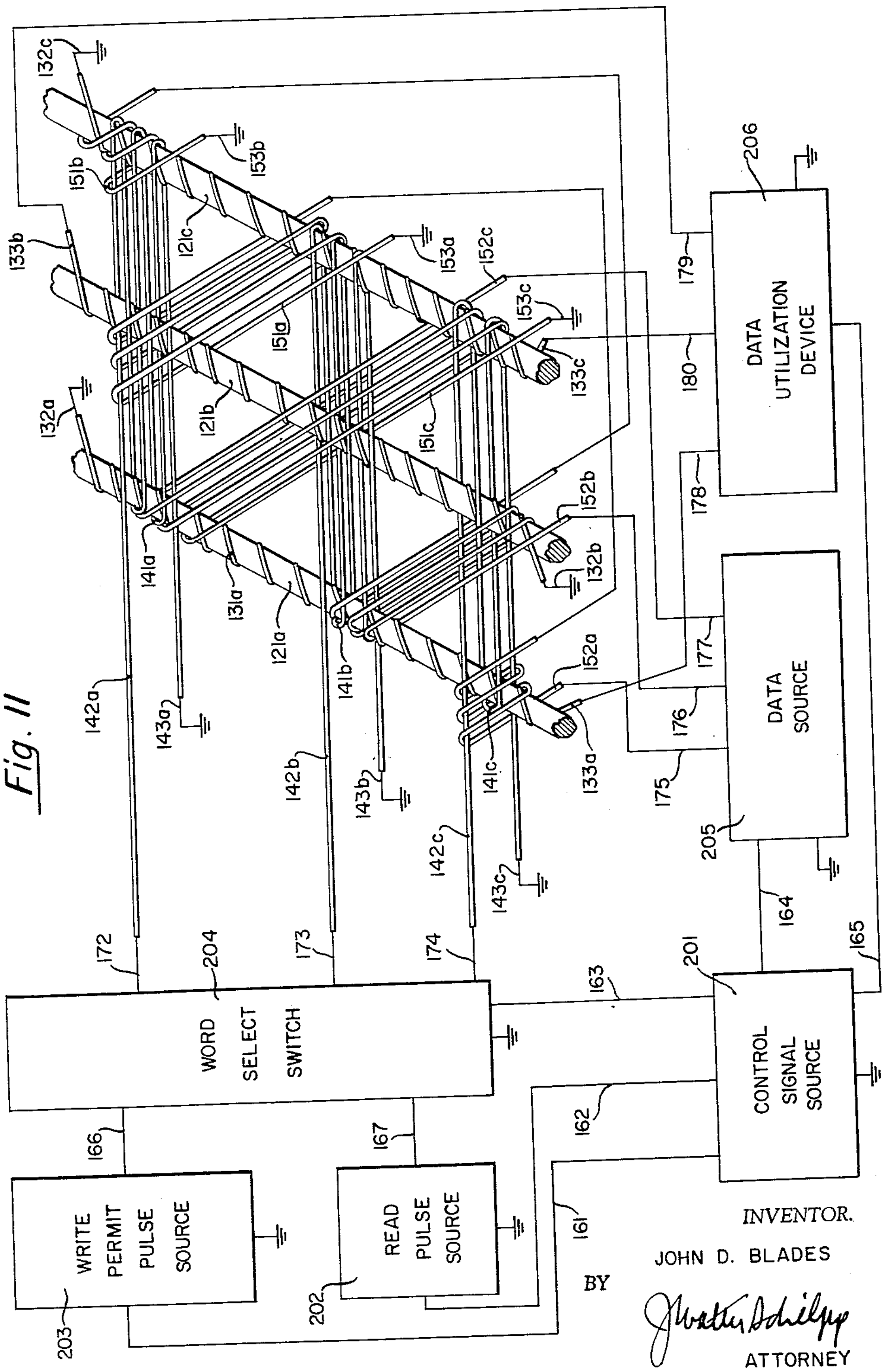
FIG. 11 illustrates an arrangement for the utilization of my invention for the recording, reading and regeneration of stored data.

FIGURE 11 represents an alternative way of practicing my invention. The operation of winding solenoids around the wrapped cores tends to be expensive and may therefore be undesirable. The operation of weaving a woof of conductors around the wrapped cores as a warp is capable of being made to produce a magnetic equivalent of the solenoids, although the conductors thus interwoven are not capable of being identified as parts of a particular equivalent solenoid. A desirable arrangement is that of FIG. 11 where horizontal conductor loops 141*a*, 141*b*, etc. are representative of equivalents of conductors 141 of FIG. 10; and conductor loops 151*a*, 151*b*, etc. are woven at right angles to the 141 series of conductors. The wrapped cores 121*a*, 131*a* and 121*b*, 131*b*, etc. are inserted diagonally within the loops of both the 141 series of conductors and the 151 series of conductors. Thus current in either series of loops will produce a magnetizing field at an angle with the axis of the core 121. The magnetizing field components from current in conductors of the 141 series and the magnetizing field components from current in conductors of the 151 series will be at an angle to each other.

FIGURE 11 includes a system using that embodiment of my invention produced by weaving of conductors and inserting wrapped cores therein, as just described above.

Cores 121*a*, 121*b* and 121*c* are shown wrapped with conductors 131*a*, 131*b* and 131*c*, respectively. Around these are woven conductors 141*a*, 141*b*, 141*c* and 151*a*, 151*b*, 151*c*. The multiplicity of passes of conductors 141 and conductors 151 causes them to constitute the equivalent of multi-turn coils wherever they are woven around a core 121. It will be observed that conductors 141 and 151 are so applied that wherever a conductor 141 is woven around a core 121, a conductor 151 is also wrapped around the core at approximately the same point. Also, since the arrangement of conductors shown does not lend itself to a uniform number of such intersections in series in each conductor 151, they have been deliberately connected so that every 151 conductor includes three such intersections. The weaving technique produces alternate reversals of winding direction at each intersection, so the polarity of connection of windings 131 has been reversed at alternate cores 121 in order to preserve the same relative polarity of all windings at any given point.

The functional rectangles indicated in FIG. 11 are convenient representations of equipment to perform certain functions, the art being amply supplied with techniques for producing such devices; but it is extremely probable that in given application of my invention these same functions may be performed by circuitry also employed for the performance of other functions not directly related with the practice of my invention, and not directly identifiable with the indicated rectangles.

In FIG. 11, the clearing operation is initiated by a signal from control signal source 201 via line 163 to word select switch 204 which causes it to connect read pulse source 202 by line 167 to a 142 terminal (for example, terminal 142*a*, via line 172). A signal from control signal source 201 via line 162 to read pulse source 202 causes the latter to send a read pulse by path 167–204–172 to terminal 142*a* through conductor 141*a* to terminal 143*a* to ground. The read pulse is of amplitude sufficient to produce within the weaves of conductor 141*a* around cores 121*a*, 121*b* and 121*c* a magnetizing field in excess of the coercive force, and therefore to set the upper ends of cores 121*a*, 121*b*, 121*c* to the reference or "zero" condition. Similar procedure may be followed to apply read pulses to conductors 141*b* and 141*c* to restore to the "zero" condition the core portions around which they are woven. Data utilization device 206 is insensitive at this time to any voltages appearing on conductors 178, 179, 180.

Recording or writing is initiated by a signal from control signal source 201 via line 163 to word select switch 204 which causes it to connect write permit pulse source 203 via line 166 to a 142 terminal (for example, terminal 142*a*, via line 172). A signal from control signal source 201 via line 161 then causes write permit pulse source 203 to transmit by path 166–204–172 to terminal 142*a* a write permit pulse through conductor 141*a* to terminal 143*a* and ground. The sign of the write permit pulse is opposite to that of the read pulse, and its amplitude is such that it produces at each volume surrounded by weaves of conductor 141*a* a magnetizing field insufficient alone to exceed the coercive force of cores 121. While the write permit pulse continues, data source 205, in compliance with a signal received from control signal source 201 via line 164 applied information signals to lines 175, 176, 177 and thus to terminals 152*a*, 152*b*, and 152*c*, respectively of conductors 151*a*, 151*b* and 151*c*. The convention applying to information signals may be that, if they represent the reference of "zero" value of information, they have negligible amplitude, but if they represent the alternate or "one" value, they have some predetermined amplitude. Let it be assuemd that the information values appearing on lines 175, 176 and 177 are, respectively, "one, zero, one." The predetermined amplitude of signal is required to be such that by itself it cannot produce within the weaves of the 151 conductor through which it flows a magnetizing field in excess of the coercive force of the cores 121, but that when combined with the magnetizing field produced by a write permit pulse flowing through the weaves of a 141 conductor, it can exceed the coercive force of the core material and will cause the adjacent core portion of 121 to reverse its magnetization to the alternate or "one" direction, thus storing an information value "one." Accordingly, the "one" signal on line 175 will cause local reversal of magnetization of the upper end of core 121*b* to the "one" state; likewise the "one" signal on line 177 will cause local reversal to the "one" state of the upper end of core 121*a*. Core 121*c* will remain in its reference or "zero" state because only a negligible signal exists on line 176. Thus the specified information is stored in the upper extremes of cores 121.

Recovery or reading of the stored information is accomplished by the selection of the proper word line by word select switch 204 in compliance with a signal received over line 163 from control signal source 201. Let it be assumed that it is line 172 which is selected and therefore connected to read pulse source 202 by way of line 167. A signal from control signal source 201 via line 162 to read pulse source 202 causes a read pulse to be sent by path 167–204–172 to terminal 142*a* through conductor 141*a* to terminal 143*a* and ground. As during the clear operation, this pulse produces magnetizing fields at the upper ends of cores 121*a*, 121*b*, 121*c* sufficient in magnitude and direction to cause them to return to or remain in the reference or "zero" condition. Cores 121*a* and 121*b*, having been locally in the alternate or "one" condition, will suffer reversal with a considerable flux change, while core 121*c*, being locally already in the reference or "zero" condition, will suffer merely the slight change from remanence to saturation. Windings 131*a* and 131*b* will accordingly have appreciable voltages induced in them and will cause such voltages to appear on lines 178 and 179; only negligible voltage will be induced in conductor 131*c* and appear on line 180. Data utilization device 206, having been made responsive to input signals on lines 178, 179, 180 by a control signal received over line 165 from control signal source 201, will receive the information thus recovered from storage and utilize it according to the predetermined characteristics of the data utilization device 206.

Thus the functions essential to the utilization of a data storage device have been explained with respect to FIG. 11.

Obviously, the extreme flexibility and facility of permutation which have rendered the digital computation, control and allied arts so prolific render it impossible to specify the many modifications of my invention which will readily occur to those skilled in the art, in the light of the disclosures herein; and, as has been indicated in the teaching of the use of my invention, the use of given circuitry to perform a large variety of functions at different times during the cycle of computer operation may well render it desirable to perform by different physical groupings of apparatus the functions herein described. Such variations in application without departure from principles herein disclosed are intended to be included in the present disclosure.

What I claim is:

1. In a binary data storage device; first conductors; second conductors substantially at right angles to said first conductors and passing between alternate first conductors; and strips of ferromagnetic material wrapped with third conductors and having a preferred direction of magnetization substantially parallel to their longest dimension located between said first conductors and said second conductors at an acute angle with said first conductors.

2. A data storage device comprising a multiplicity of pieces of ferromagnetic material having each a preferred direction of magnetization substantially along the length of each said piece, the said length of said piece being at least ten times its width and at least ten times its thickness; conduction paths located substantially helically around the length of each said piece as axis; and conductors woven as woof upon said pieces of ferromagnetic material and said conduction paths as warp.

3. A data storage device comprising first conductors and second condctors woven together as woof and warp; long pieces of ferromagnetic material having substantially rectangular hysteresis loops in the general direction of their lengths and surrounded by helically wound third conductors, the said pieces of ferromagnetic material and third conductors wound thereabout being inserted at acute angles with said woof and warp and passing between said woof and said warp at at least some of their crossings.

4. A binary data storage device comprising a multiplicity of pieces of ferromagnetic material each capable of assuming bistable states of magnetic remanence representative respectively of stored binary logical information, said ferromagnetic material having a preferred direction of magnetization substantially along the length of each said piece, the length of each of said pieces being substantially greater than its width or thickness, first conductors and second conductors so interwrapped with said pieces of ferromagnetic material and with each other that electric current through any one of said first conductors will produce in a discrete area of at least one of said pieces of ferromagnetic material a magnetizing field not parallel to the preferred direction of magnetization of said one piece of ferromagnetic material, and that electric current through one of said second conductors will produce in said discrete area of said one piece of ferromagnetic material a magnetizing field not parallel to the preferred direction of magnetization of said one piece of ferromagnetic material nor parallel to the magnetizing field produced by current through said first conductor, orientation of the magnetic field effected respectively by said first conductor and said second conductor being such that the resultant of the said magnetic fields is substantially parallel to said preferred direction of magnetization of the ferromagnetic material in said discrete area, said magnetic material in said discrete area assuming one or the other of its stable remanent states in response to the coincident flow of current in said first and second conductors.

5. A binary data storage device comprising: strips of ferromagnetic material each capable of assuming bistable states of magnetic remanence representative respectively of stored binary logical information, said ferromagnetic material having a direction of easy magnetization parallel to its longest dimension and oriented in the form of a helix having a closed magnetic path of easy magnetization which extends outside of said ferromagnetic material; conducting means situated respectively on both sides of said ferromagnetic material but not piercing said ferromagnetic material, capable by coincident application of currents to said conducting means of selectively altering the remanent magnetization of selected parts of each of said strips; means for selectively applying said currents to said conducting means to produce said selective alteration of said remanent magnetization; and means for selectively detecting by voltages induced in said conducting means said selective alteration of said remanent magnetization.

6. A bistable storage element comprising at least one central electrical conductor having wrapped therearound at least one strip of ferromagnetic material having a preferred direction of magnetization parallel to its longest dimension and being capable of assuming bistable states of magnetic remanence representative respectively of stored binary logical information, said strip of ferromagnetic material when wrapped around said central conductor exhibiting a prefered direction of magnetization or magnetic axis substantially helical about said central conductor, and a multiplicity of solenoidal conductors wound around said wrapped central conductor as an axis, the solenoids thus formed being located successively along the length of said wrapped central conductor without overlapping each other, drive means for applying current selectively to at least certain of said solenoidal conductors whereby said binary information is stored along the length of said wrapped central conductor.

7. A bistable storage element as defined in claim 6 characterized in that said strip of ferromagnetic material is substantially rectangular in cross-section.

8. A bistable storage element comprising more than one central electrical conductor having wrapped therearound at least one strip of ferromagnetic material having a preferred direction of magnetization parallel to its longest dimension and being capable of assuming bistable states of magnetic remanence representative respectively of stored binary logical information, said strip of ferromagnetic material when wrapped around said central conductor exhibiting a preferred direction of magnetization or axis substantially helical about said central conductor, and at least one other conductor forming a loop around the wrapped central conductors and approximately at right angles to said axis of said central conductors, drive means for applying current selectively to at least said one of said other conductors whereby said binary information is stored along the axis of said wrapped central conductors.

9. A bistable storage element as defined in claim 8 characterized in that said one strip of ferromagnetic material is substantially rectangular in cross-section.

10. A bistable storage element as defined in claim 9 further characterized in that the thickness of said one strip of ferromagnetic material measured along a radial line from the center of the central electrical conductor around which it is wrapped, is substantially less than the width of said one strip.

11. A bistable storage element comprising at least one central electrical conductor having wrapped therearound at least one strip of ferromagnetic material having a preferred direction of magnetization parallel to its longest dimension and being capable of attaining opposed states of residual flux density in representing binary logical information, said strip of ferromagnetic material when wrapped around said central conductor exhibiting a preferred direction of magnetization substantially helical about said central conductor, a plurality of distinct electrical conductors axially spaced from one another along said wrapped central conductor, each of said distinct conductors encircling said wrapped central conductor about discrete areas thereof, conditional current means for applying electrical signals respectively to said latter conductors and to said central conductor for effecting the magnetization of said discrete areas whereby binary logical information is stored in each of said areas.

12. A bistable storage element comprising at least one central electrical conductor in an unstressed condition having wrapped therearound at least one strip of ferromagnetic material having a preferred direction of magnetization parallel to its longest dimension and being capable of attaining opposed states of residual flux density in representing binary logical information, said strip of ferromagnetic material when wrapped around said central conductor exhibiting a preferred direction of magnetization substantially helical about said central conductor, a plurality of distinct electrical conductors axially spaced from one another along said wrapped central conductor, each of said distinct conductors encircling said wrapped central conductor over discrete areas thereof, conditional current means for applying electrical signals respectively to said distinct conductors and to said central conductor for causing said discrete areas to be magnetized in either one or the other of said states of residual flux density, the change in magnetic state of each of said discrete areas of ferromagnetic material in response to said applied electrical signals inducing a voltage in selected ones of said conductors.

13. A bistable storage element comprising at least one central electrical conductor, a conductive strip of ferromagnetic material capable of assuming bistable states of magnetic remanence representative respectively of stored binary logical information, said ferromagnetic material having a preferred direction of magnetization parallel to its longest dimension and insulated electrically at points of casual contact with other electrical conductors and at point of casual contact between different parts of itself, said strip of ferromagnetic material being wound in a helix around said central conductor, a plurality of distinct electrical conductors axially spaced from one another along said central conductor, each of said distinct conductors being positioned at right angles to said central conductor and encircling discrete areas thereof, conditional current means for applying electrical signals respectively to said distinct conductors and to said central conductor for causing the ferromagnetic material in each of said discrete areas to assume one or the other of said bistable states of magnetic remanence and means including selected ones of said conductors for detecting the change in the magnetic remanent state of each of said discrete areas in response to said applied electrical signals.

14. A binary data storage device comprising a multiplicity of insulated central conductors, a multiplicity of conductive strips of ferromagnetic material each capable of assuming bistable states of magnetic remanence representative respectively of stored binary logical information, said ferromagnetic material having a preferred direction of magnetization parallel to its longest dimension of said strip, each of said strips of ferromagnetic material being wound in a helix around one of said multiplicity of central conductors, a multiplicity of insulated second conductors axially spaced from one another along each of said central conductors, each of said second conductors being positioned at right angles to said central conductor and encircling discrete areas thereof, means for connecting in series homologous ones of said second conductors associated respectively with different central conductors, conditional current means for selectively applying current to said central conductors, said second conductors and said conductive strips of ferromagnetic material for causing the ferromagnetic material in each of said discrete areas to assume one or the other of said bistable states of magnetic remanence, and means including selected ones of said conductors for detecting a change in the magnetic remanent state of each of said discrete areas in response to said applied electrical signals.

15. A binary data storage device comprising a multiplicity of insulated central conductors, a multiplicity of conductive strips of ferromagnetic material each capable of assuming bistable states of magnetic remanence representative respectively of stored binary logical information, said ferromagnetic material having a preferred direction of magnetization parallel to its longest dimension of said strip, each of said strips of ferromagnetic material being wound in a helix around one of said multiplicity of central conductors, a multiplicity of insulated second conductors woven as a weft upon said wrapped central conductors as a warp, each of said second conductors encircling discrete areas of the wrapped central conductor with which it is associated, means for connecting said second conductors into a plurality of circuits, each of said circuits comprising at least one continuous turn encircling one of said wrapped central conductors in series with at least one continuous turn encircling at least one other of said wrapped central conductors, conditional current means for selectively applying current to said central conductors, said second conductors and said conductive strips of ferromagnetic material for causing the ferromagnetic material in each of said discrete areas to assume one or the other of said bistable states of magnetic remanence, and means including selected ones of said conductors for detecting a change in the magnetic remanent state of each of said discrete areas in response to said applied electrical signals.

16. A binary data storage device comprising a multiplicity of pieces of ferromagnetic material each capable of assuming bistable states of magnetic remanence representative respectively of stored binary logical information, said ferromagnetic material having a preferred direction of magnetization substantially along the length of each of said pieces, the length of each of said pieces being substantially greater than its width or thickness, first conductors and second conductors interwoven with said pieces of ferromagnetic material and with each other whereby application of a first electric current pulse to a selected one of said first conductors and application of a second electric current pulse to a selected one of said second conductors will produce at the nearest juxtaposition of said selected first conductor and said selected second conductor a magnetizing field sufficient in magnitude and direction to cause only the discrete area of said piece of ferromagnetic material adjacent to said juxtaposition to switch from one stable state of magnetic remanence to its other stable state.

17. A bistable magnetic data storage element comprising: at least one central conductor in an unstressed condition; at least one strip of magnetic material having a substantially rectangular cross-section, said material having a preferred direction of magnetization parallel to its longest dimension and being capable of assuming bistable states of magnetic remanence representative respectively of stored binary logical information, said strip of magnetic material being wrapped around said central conductor in such fashion that the said preferred direction of magnetization is substantially helically disposed around said central conductor; and at least one second conductor external to said central conductor and to said strip of magnetic material; in such proximity and so disposed relative thereto as to be capable, by passage of electric current through said second conductor, of producing a magnetizing field substantially at right angles to the magnetizing field produced by passage of electric current through said central conductor, and means for selectively pulsing said conductors with electrical currents.

18. A bistable storage element comprising at least one central electrical conductor in an unstressed condition having wrapped therearound at least one strip of ferromagnetic material having a preferred direction of magnetization parallel to its longest dimension and being capable of assuming bistable states of magnetic remanence representative respectively of stored binary logical information, said ferromagnetic material when wrapped around said central conductor exhibiting a preferred direction of magnetization or magnetic axis substantially helical about said central conductor, said strip of ferromagnetic material being substantially rectangular in cross-section, the thickness of said strip of ferromagnetic material measured along a radial line from the center of said central electrical conductor being substantially less than the width of said strip, a multiplicity of solenoidal conductors wound around said wrapped central conductor as an axis, the solenoids thus formed being located successively along the length of said wrapped central conductor without overlapping each other, drive means for applying current selectively to at least certain of said solenoidal conductors whereby said binary information is stored along the length of said wrapped central conductor.

19. A bistable storage element as defined in claim 18 further characterized in that the ratio of the width of said strip of ferromagnetic material to its thickness lies within the approximate range of 10 to 1, to 250 to 1.

20. A bistable storage element comprising at least one central electrical conductor having wrapped therearound at least one strip of ferromagnetic material having a preferred direction of magnetization parallel to its longest dimension and being capable of attaining opposed states of residual flux density in representing binary logical information, said strip of ferromagnetic material when wrapped around said central conductor exhibiting a preferred direction of magnetization substantially helical about said central conductor, said strip of ferromagnetic material being substantially rectangular in cross-section, a plurality of distinct electrical conductors axially spaced from one another along said wrapped central conductor, each of said distinct conductors encircling said wrapped central conductor about discrete areas thereof, conditional current means for applying electrical signals respectively to said latter conductors and to said central conductor for effecting the magnetization of said discrete areas whereby binary logical information is stored in each of said areas.

21. A bistable storage element as defined in claim 20 further characterized in that the ratio of the width of said strip of ferromagnetic material to its thickness lies within the approximate range of 10 to 1, to, 250 to 1.

22. A bistable storage element comprising at least one central electrical conductor, a conductive strip of ferromagnetic material capable of assuming bistable states of magnetic remanence representative respectively of stored binary logical information, said ferromagnetic material having a preferred direction of magnetization parallel to its longest dimension and insulated electrically at points of casual contact with other electrical conductors and at point of casual contact between different parts of itself, said strip of ferromagnetic material being wound in a helix around said central conductor, said strip of ferromagnetic material being substantially rectangular in cross-section, a plurality of distinct electrical conductors axially spaced from one another along said central conductor, each of said distinct conductors being positioned at right angles to said central conductor and encircling discrete areas thereof, conditional current means for applying electrical signals respectively to said distinct conductors and to said central conductor for causing the ferromagnetic material in each of said discrete areas to assume one or the other of said bistable states of magnetic remanence and means including selected ones of said conductors for detecting the change in the magnetic remanent state of each of said discrete areas in response to said applied electrical signals.

23. A bistable storage element as defined in claim 22 further characterized in that the ratio of the width of said strip of ferromagnetic material to its thickness lies within the approximate range of 10 to 1, to, 250 to 1.

24. A binary data storage device comprising a multiplicity of insulated central conductors, a multiplicity of conductive strips of ferromagnetic material each capable of assuming bistable states of magnetic remanence representative respectively of stored binary logical information, said ferromagnetic material having a preferred direction of magnetization parallel to its longest dimension of said strip, each of said strips of ferromagnetic material being wound in a helix around one of said multiplicity of central conductors, each of said strips of ferromagnetic material being substantially rectangular in cross-section, a multiplicity of insulated second conductors axially spaced from one another along each of said central conductors, each of said second conductors being positioned at right angles to said central conductor and encircling discrete areas thereof, means for connecting in series homologous ones of said second conductors associated respectively with different central conductors, conditional current means for selectively applying current to said central conductors, said second conductors and said conductive strips of ferromagnetic material for causing the ferromagnetic material in each of said discrete areas to assume one or the other of said bistable states of magnetic remanence, and means including selected ones of said conductors for detecting a change in the magnetic remanent state of each of said discrete areas in response to said applied electrical signals.

25. A binary data storage device as defined in claim 24 characterized in that the thickness of each of said strips measured along a radial line from the center of the central conductor around which it is wound is substantially less than the width of said strip.

26. A binary data storage device as defined in claim 25 further characterized in that the ratio of the width of each of said strips of ferromagnetic material to its thickness lies within the approximate range of 10 to 1, to, 250 to 1.

References Cited in the file of this patent

UNITED STATES PATENTS 3,083,353 Bobeck ---------------- Mar. 26, 1963

OTHER REFERENCES

Publication I, "1955 Western Joint Computer Conference," pages 111 to 116, published August 1955.